US012269184B2

(12) United States Patent
Gori (10) Patent No.: US 12,269,184 B2
(45) Date of Patent: Apr. 8, 2025

(54) METHOD AND APPARATUS FOR ALIGNING A CUTTING TRAJECTORY (71) Applicant: FK GROUP S.P.A., Dalmine (IT)

(72) Inventor: Sergio Gori, Arezzo (IT)

(73) Assignee: FK Group S.P.A., Dalmine (IT)

( * ) Notice: Subject to any disclaimer, the term of this patent is extended or adjusted under 35 U.S.C. 154(b) by 880 days.

(21) Appl. No.: 16/972,083

(22) PCT Filed: Jul. 16, 2019

(86) PCT No.: PCT/IB2019/056064
§ 371 (c)(1),
(2) Date: Dec. 4, 2020

(87) PCT Pub. No.: WO2020/021386
PCT Pub. Date: Jan. 30, 2020

(65) Prior Publication Data
US 2021/0221020 A1    Jul. 22, 2021

(30) Foreign Application Priority Data
Jul. 25, 2018  (IT) .......................... 102018000007493

(51) Int. Cl.
B26F 1/38     (2006.01)
B26D 5/00     (2006.01)

(52) U.S. Cl.
CPC ............ *B26F 1/3813* (2013.01); *B26D 5/007* (2013.01); *B26D 2005/002* (2013.01); *G05B 2219/45038* (2013.01)

(58) Field of Classification Search
CPC . B26F 1/3813; B26D 5/007; B26D 2005/002; G05B 2219/45038
See application file for complete search history.

(56) References Cited

U.S. PATENT DOCUMENTS 4,941,183 A * 7/1990 Bruder ...................... C14B 5/00
                                                     83/522.11
4,961,149 A * 10/1990 Schneider ................ D06H 7/00
                                                      83/76.4
(Continued)

FOREIGN PATENT DOCUMENTS

EP          3342568 A1      7/2018

OTHER PUBLICATIONS

Written Opinion and International Search Report for International Patent Application No. PCT/IB2019/056064, mailed Oct. 14, 2019, 15 pages.

(Continued)

Primary Examiner — Robert J Eom
(74) Attorney, Agent, or Firm — Armstrong Teasdale LLP (57) ABSTRACT A method for aligning a cutting trajectory of a flat element with respect to a graphic pattern present on the flat element, includes positioning the flat element to be cut on a support table, projecting onto the flat element the image of a reference figure uniquely associated with coordinates of the cutting trajectory and/or of the graphic pattern, framing, by a camera, a portion of the flat element where at least one part of the graphic pattern and of the image of the reference figure are present, displaying on a monitor the image framed by the camera and a virtual image of the graphic pattern defined by coordinates of the graphic pattern, and moving the image of the reference figure or the virtual image of the graphic pattern until a portion of the virtual image of the graphic pattern coincides with the corresponding real image of the graphic pattern.

3 Claims, 6 Drawing Sheets (56) References Cited

U.S. PATENT DOCUMENTS

| | | | |
|---|---|---|---|
| 5,172,326 | A | 12/1992 | Campbell, Jr. et al. |
| 6,434,444 | B2 * | 8/2002 | Herman, Jr. ........... B26D 5/005 |
| | | | 700/134 |
| 2002/0002416 | A1 | 1/2002 | Herman, Jr. |
| 2013/0177215 | A1 | 7/2013 | Campbell et al. |
| 2016/0031110 | A1 | 2/2016 | Middleton et al. |

OTHER PUBLICATIONS

International Preliminary Report on Patentability for International Patent Application No. PCT/IB2019/056064, mailed Nov. 4, 2020, 11 pages.

* cited by examiner

METHOD AND APPARATUS FOR ALIGNING A CUTTING TRAJECTORY

CROSS-REFERENCE TO RELATED APPLICATIONS

This application is a National Stage Application of International Patent Application No. PCT/IB2019/056064, having an International Filing Date of Jul. 16, 2019, claiming priority to Italian Patent Application No. 102018000007493, having a filing date of Jul. 25, 2018, each of which is hereby incorporated by reference in its entirety.

FIELD OF THE INVENTION

The present invention relates in general to machines for cutting shapes of a flat element, such as a fabric, a leather, a sheet of glass, of wood, etc., and relates in particular to a method and an apparatus for aligning a cutting trajectory with respect to a graphic pattern present on said flat element.

BACKGROUND OF THE INVENTION

In some applications, for example in the field of haute couture or in any case in the production of clothing or other high-end products, it is necessary to guarantee the maximum possible precision in cutting a shape of the flat element, for example a fabric, according to a cutting trajectory that a designer has identified with respect to one or more graphic elements present on the flat element, for example a drawing, a geometric pattern, etc.

In other words, starting from a flat element bearing graphic patterns, it is desired that the shape that is cut contains one or more graphic patterns positioned exactly where the designer had planned.

Usually, the cutting operation is carried out starting from a CAD working file which contains the coordinates of the cutting trajectory to be supplied to a cutting machine. These coordinates are selected also or above all according to the position of the graphic patterns present on the flat element to be cut.

One of the difficulties encountered in trying to obtain the required precision in terms of positioning the shape to be cut with respect to the graphic patterns present in the flat element, especially in the case of cutting flat elements having a certain degree of dimensional deformability, such as fabrics or leathers, is linked to the fact that, although the support table on which the flat element is positioned to be cut, is generally provided with reference systems that help the operator in positioning the flat element on the support, it is never possible to ensure that the flat elements are positioned on the support table all in the same and precise position.

Indeed it happens that, with respect to the theoretical position chosen by the designer and described by the coordinates of the working file, once the flat element has been manipulated and put into the machine, the effective cutting trajectory is displaced even by several millimeters, if not even centimeters, with respect to such a theoretical position and therefore with respect to the graphic patterns with respect to which the cutting trajectory must have the desired coordinates.

Several alignment systems have already been proposed which seek to correct this difference between the theoretical position and the actual position of the cutting trajectory, but none of them has been particularly effective, since it cannot guarantee a high degree of precision.

SUMMARY OF THE INVENTION

The object of the present invention is to propose a method and an apparatus capable of meeting the aforementioned precision requirement in positioning the cutting trajectory with respect to graphic patterns present on the element to be cut.

Said object is achieved by an alignment method and an apparatus as described and claimed herein. Preferred embodiments of the invention are also described.

BRIEF DESCRIPTION OF THE DRAWINGS

The features and the advantages of the method and of the apparatus according to the invention shall be made readily apparent from the following description of preferred embodiments thereof, provided purely by way of a non-limiting example, with reference to the accompanying figures, in which.

DETAILED DESCRIPTION

In said drawings, reference numeral 1 indicates as a whole an apparatus for aligning a cutting trajectory 2' of a flat element 3 with respect to an ideal cutting path determined by the presence of one or more graphic patterns 4 on the flat element 3.

The apparatus 1 comprises a support table 10 suitable to receive the flat element 3 to be cut. The flat element 3 may be a fabric, a leather, a glass sheet, rubber, wood or other material.

The flat element 3 bears one or more graphic patterns 4, which may be decorative patterns or recurrent geometric patterns, for example lines, squares, etc.

The flat element 3 must be cut so as to obtain one or more shapes 5, at least one of which containing a graphic pattern 4.

For example, in the case of clothing fabric, the flat element 3 must be cut according to predetermined shapes 5 which correspond to parts of the item of clothing to be made.

As stated above, it is desired that at least one graphic pattern 4 be found in a very precise position with respect to the shape 5.

Knowing a reference system with respect to which the dimensional features of the flat element 3 to be cut with its graphic patterns 4, for example a Cartesian axis system, are uniquely defined, in the design step the desired trajectory 2' of the shapes to be cut is selected. The trajectory 2' is defined by a set of points, each of which is described by spatial coordinates in the reference system.

These spatial coordinates of the cutting trajectory 2' are stored in a working file.

Having established in advance the exact position of the cutting trajectory 2' with respect to at least one graphic pattern 4, the working file also contains the position coordinates of the set of points that define the graphic pattern 4' with respect to the cutting trajectory 2'.

The working file is accessible from a processing unit 12 of the alignment apparatus 1.

As will be described below, the coordinates of the cutting trajectory 2' stored in the working file can be modified with respect to an origin of the reference system during the alignment procedure, until final coordinates 2 of the cutting trajectory are obtained. Therefore, the starting or theoretical coordinates of the cutting trajectory 2' are also defined as "initial coordinates", to differentiate them from the "final" coordinates that are obtained at the end of the alignment procedure.

The alignment apparatus is provided with a user interface 14, comprising a display device 16, for example a screen, and control means 18 by which an operator may locate the working file and display on the display device an image of the flat element and the cutting trajectory;

The alignment apparatus 1 comprises, on the support table 10, a frame 20 which supports at least one projector device 22 and at least one camera 24.

The projector device 22 is configured so as to project on the flat element 3 placed on the support table 10, an image of a reference FIG. 6 uniquely associated with the coordinates of the cutting trajectory 2' or the coordinates of the graphic pattern 4'.

In one embodiment, the reference FIG. 6 is the same cutting trajectory 2' or the image of the reference graphic pattern 4', or both. For example, once the working file has been located, the user interface is configured to allow the operator to select the cutting trajectory 2' or the graphic pattern 4', or both, to be projected onto the flat element 3 by the projector device 22.

In one embodiment, the projector device 22 may be provided, for its functionality, with electric axes controlled by the processing unit 12 to be positioned, before the start of the alignment process, in a suitable position above the flat element 3. For example, the processing unit 12 may control the electric axes to position the projector device on the basis of the coordinates of the cutting trajectory 2' present in the working file.

In one embodiment, the projector device 22 uses laser technology to project, through a system of suitably oriented lenses, the image of the reference FIG. 6.

In one embodiment, the lens system is controlled by electric motors which allow the lenses of the lens system to be oriented so as to translate the image of the reference FIG. 6 projected onto the flat element 3 without the need to move the projector device 22.

The camera 24 is controlled by the processing unit 12 so as to frame at least a portion of the flat element 3 wherein there is present at least a part of the graphic pattern 4 and at least a part of the image of the reference FIG. 6.

In one embodiment, the camera 24 may be moved, for example by means of its own electric axes to frame the working area in detail.

The image taken by the camera is sent to the processing unit 12 to be displayed on the screen 16.

As mentioned above, and as shown in FIG. 3, the image 7 of the working file, in particular the images of the cutting trajectory 2' and of the graphic pattern 4' may also be displayed on the screen 16. These images deriving from the working file may be defined as "virtual" to distinguish them from the "real" images framed by the camera.

Figure 1:
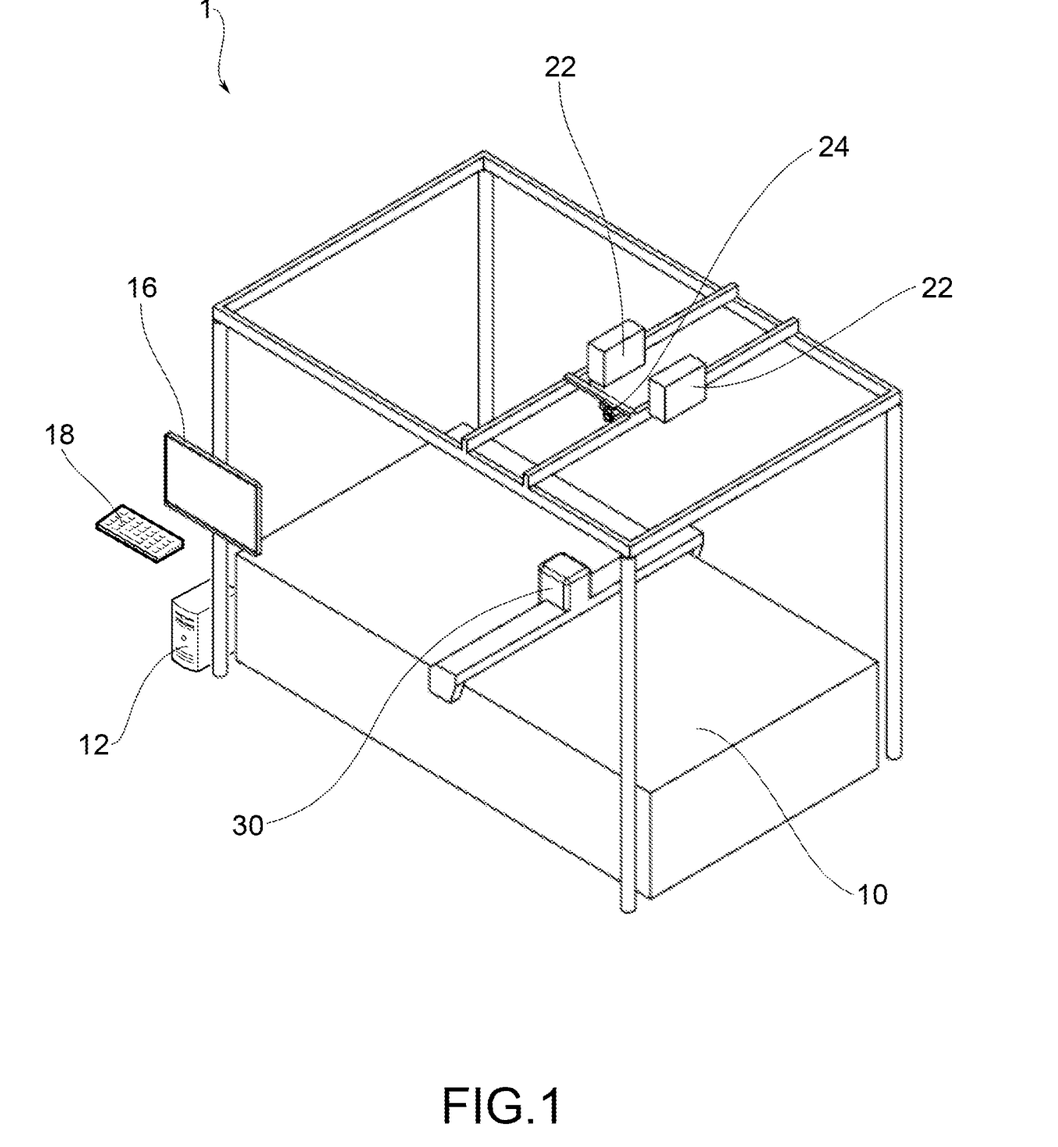
FIG. 1 schematically illustrates an example of an alignment and cutting apparatus according to the invention.
Figure 2:
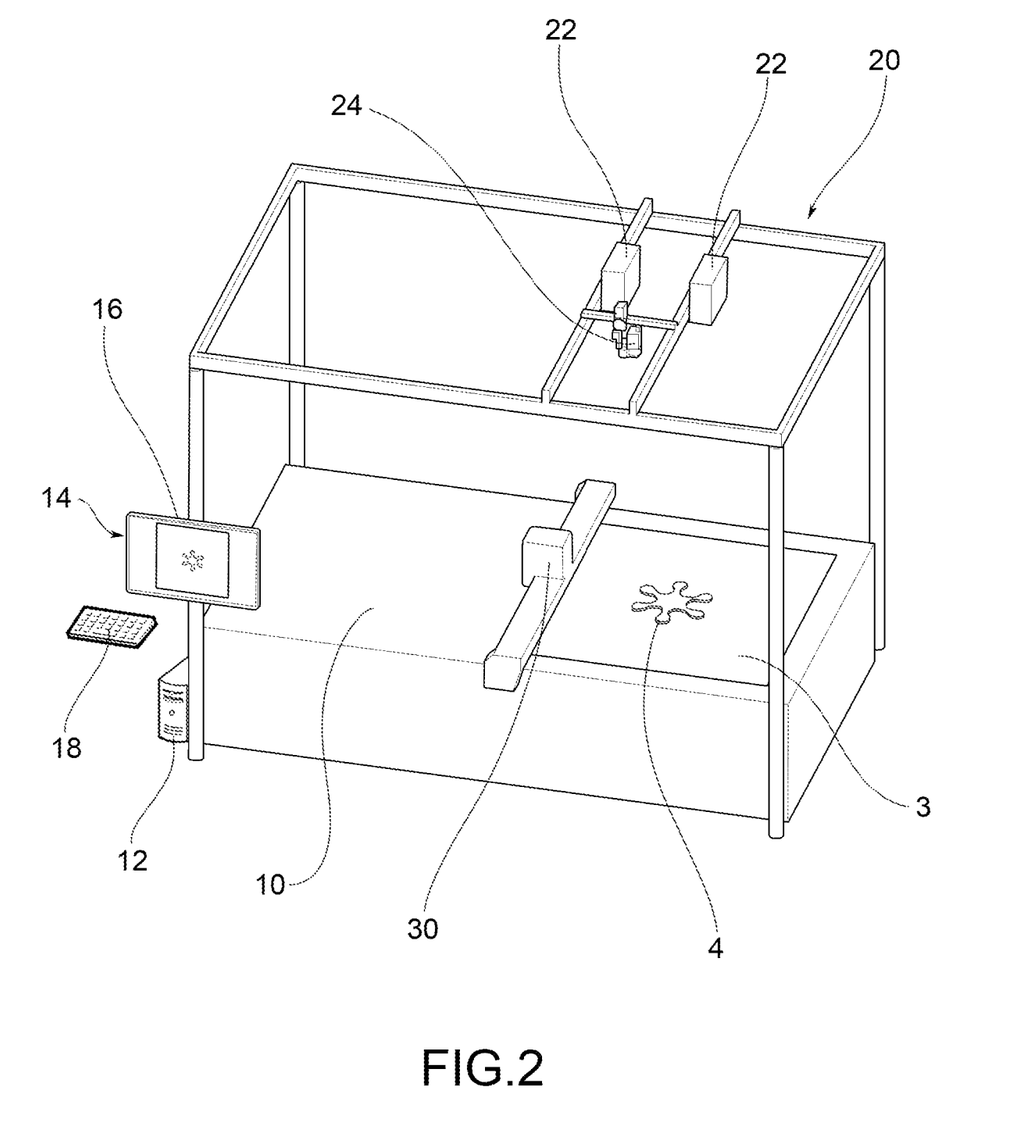
FIG. 2 shows the machine with a flat element to be cut, positioned on the support table and before the start of the alignment procedure.
Figure 3:
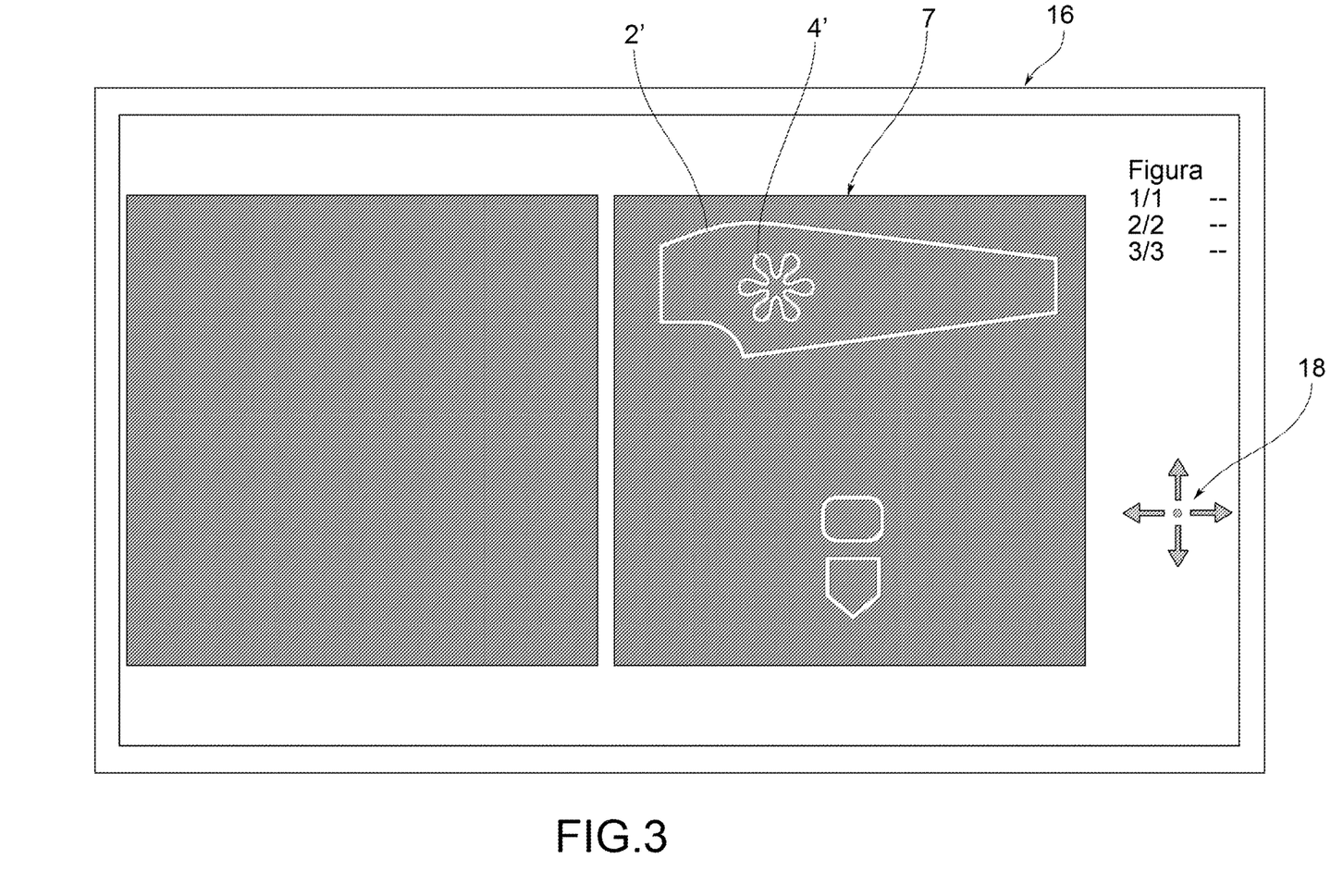
FIGS. 3, 3a and 3b show as many steps of the alignment procedure of the cutting trajectory with respect to a graphic pattern present on a flat element to be cut.

FIGS. 2 and 3 represent a first step of the alignment method. The flat element 3 is located on the support table 10 and the projector device 22 and the camera 24 are positioned above the flat element 3. The operator locates the image 7 of the working file to be displayed on the screen. In this step, the camera 24 has not yet been activated or in any case the image taken by the camera has not yet been displayed on the screen 16.

Figure 2A:
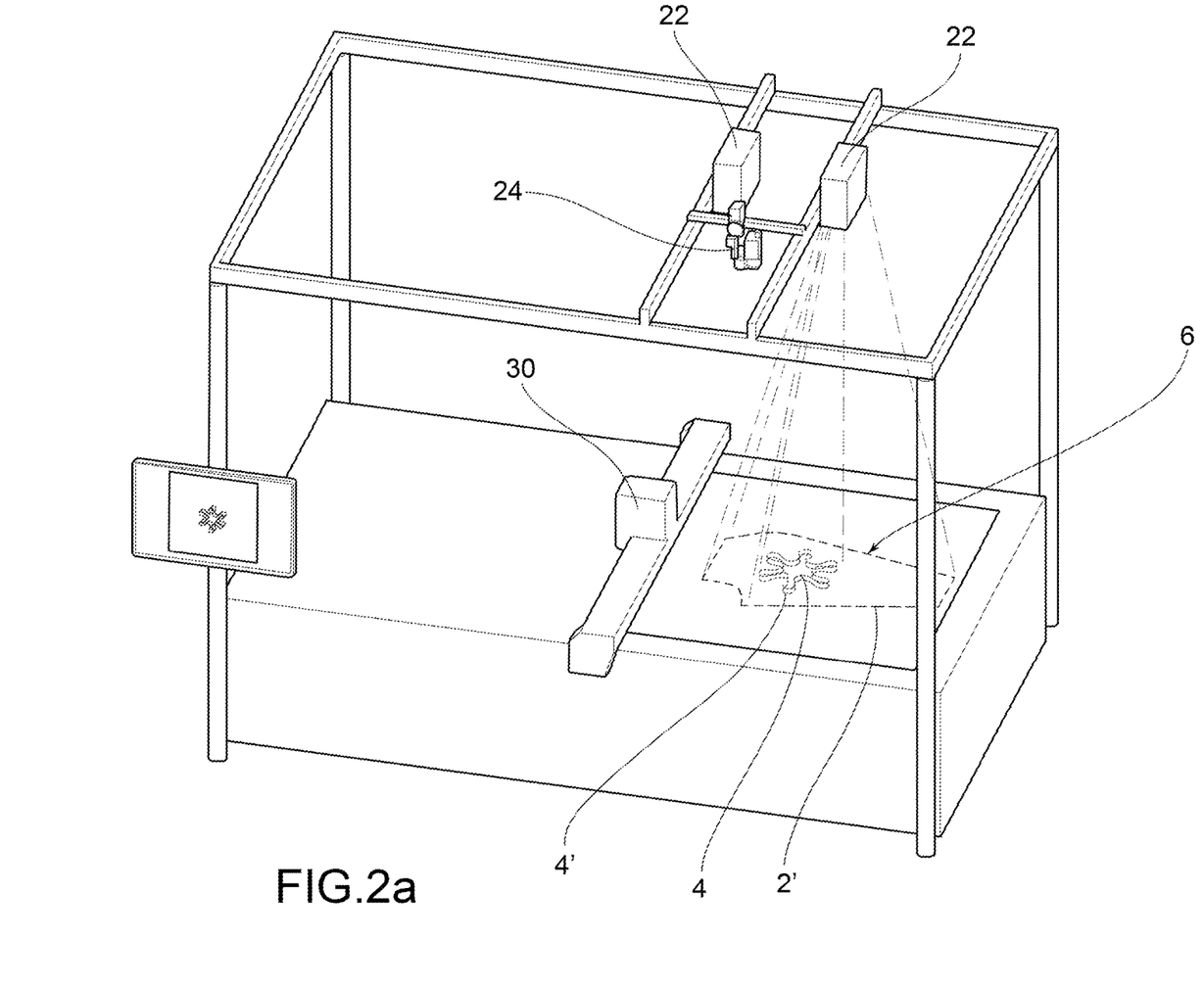
FIG. 2a is a view similar to the previous one, with the machine in the alignment step.

FIG. 2a shows the machine during the alignment procedure. At least one projector device 22 projects the image of the reference FIG. 6 onto the flat element 3 and the camera 24 frames a portion of the flat element 3 which at least partially includes the graphic pattern 4 and the image of the reference FIG. 6.

Figure 3A:
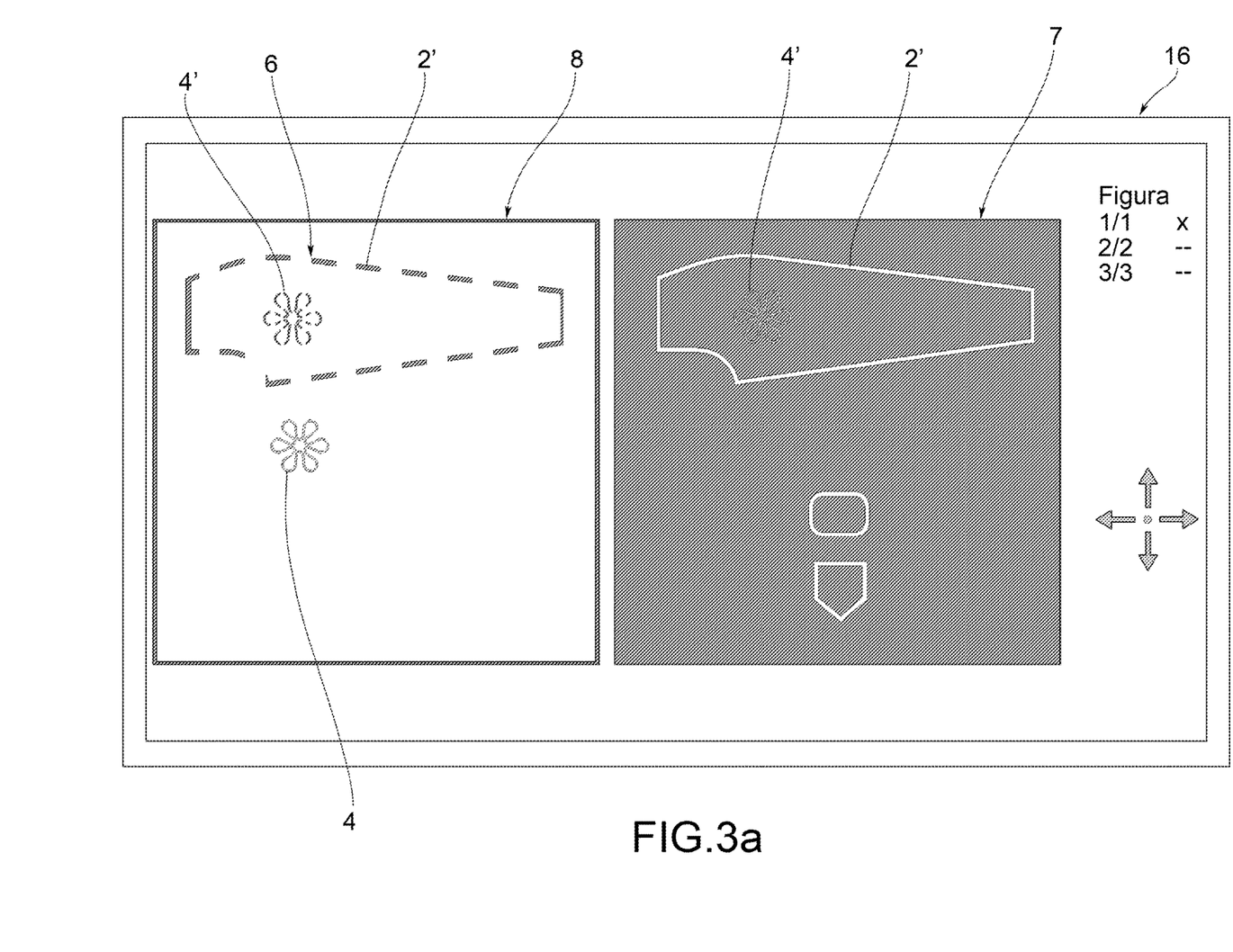

FIG. 3a shows the screen 16 on which the image 7 of the working file and the image 8 taken by the camera 24 are displayed simultaneously, for example on two side-by-side portions of the display area.

The image 8 framed by the camera includes the graphic pattern 4 and the reference FIG. 6. In the illustrated embodiment, the reference FIG. 6 consists of the image of the graphic pattern 4' and of the cutting trajectory 2'. In the example, the reference FIG. 6 is shown exaggeratedly misaligned with respect to the graphic pattern 4.

In one embodiment, the processing unit 12 is configured to allow the operator to select and move the virtual image of the graphic pattern 4' or the image of the reference FIG. 6 framed by the camera until at least one portion the virtual image of the graphic pattern 4' coincides with a corresponding portion of the real image of the graphic pattern 4 framed by the camera 24.

Figure 3B:
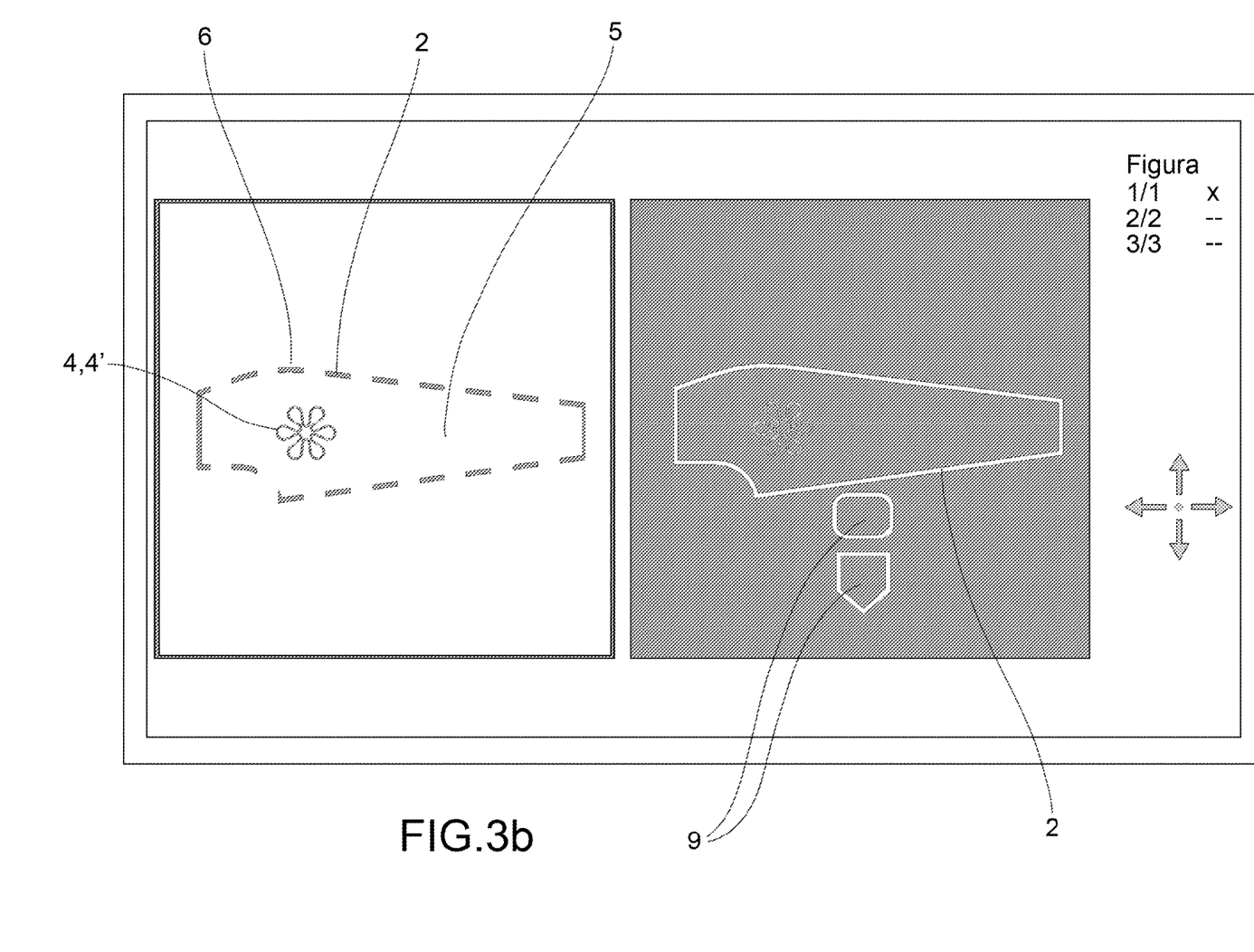

The displacement of the virtual image of the graphic pattern 4' or of the reference FIG. 6 is shown in FIG. 3b.

For example, if for the reference FIG. 6 the virtual image of the graphic pattern 4' is used, the operator can select and move the image of the projected reference FIG. 6, framed by the camera and displayed on the screen, or select and move the virtual image of the graphic pattern 4' resulting from the working file and displayed on the screen. In both cases, the effect produced is that of a translation of the virtual image of the graphic pattern 4' up to its superimposition on the real image of the graphic pattern 4 framed by the camera 24.

If the operator acts on the reference FIG. 6 framed by the camera, he can enlarge the image up to a desired level of detail to obtain a very high alignment accuracy.

If the operator acts on the virtual image of the graphic pattern 4' deriving from the working file, he can have the advantage, if a larger portion of the flat element project defined by the working file is displayed, of also checking how the cutting trajectory 2' connected to the image of the selected graphic pattern 4' moves, with respect for example to other elements 9 of the project.

More in detail, the displacement of the image of the reference FIG. 6 is obtained by selecting, through the user interface 14, the virtual image of the graphic pattern 4' or the image of the reference FIG. 6, moving this virtual image of the graphic pattern or of the reference figure, and updating the coordinates of the reference FIG. 6 accordingly.

On the basis of the updated coordinates of the reference figure, the electric motors of the lens system are controlled so that they update their orientation.

It should be noted that, in the case in which the projector device 22 projects the image of the graphic pattern 4' as a reference figure, the operator can verify the alignment both on the screen and on the flat element placed on the support table of the apparatus.

In the case of display and selection of the image of the cutting trajectory 2', a displacement of this image corresponds to a same displacement of the virtual image of the graphic pattern 4', which can be either projected and displayed on the flat element, or displayed on the screen superimposed on the real image of the graphic pattern framed by the camera.

In one embodiment, while the operator moves the virtual image of the graphic pattern and/or the cutting trajectory to be aligned, the processing unit 12 calculates the coordinates to be supplied to the electric motors of the lens system to also display on the flat element the displacement of the reference FIG. 6.

When the reference FIG. 6 coincides with the image of the graphic pattern 4', the operator can then verify, both on the display device and by directly observing the flat element, when the reference figure (or, for example, a portion thereof enlarged by the camera) is superimposed exactly on the real image of the graphic pattern 4.

In an embodiment variant, when the reference FIG. 6 coincides with the image of the graphic pattern 4', the operator could directly control the electric motors of the lens system, for example with a joystick, so as to move the reference FIG. 6 until it exactly overlaps the graphic pattern 4 present on the flat element.

When the virtual image of the graphic pattern is superimposed onto the real image, the final coordinates of the cutting trajectory are saved in the working file.

In one embodiment, the alignment apparatus is made on the cutting machine itself. The latter therefore comprises, in addition to the devices of the alignment apparatus described above, a cutting head 30 movable on the flat element 3 to carry out the cutting of shapes following the cutting trajectories memorized at the end of the alignment procedure.

In one embodiment, the alignment apparatus 1 comprises a cutting support on which the flat element is positioned before the alignment procedure and which is adapted to be traversed by the blade of a cutting head 30.

In an embodiment variant, the flat element is positioned on a rigid support suitable for transport, for example made of paper or similar materials. At the end of the alignment procedure, the rigid support with the flat element integral therewith is removed from the support table and positioned on a separate cutting machine, which comprises a cutting head movable on the flat element according to the cutting trajectory obtained from the alignment procedure. For example, the cutting head may be moved by electric axes controlled by an axis control unit in which the final coordinates of the cutting trajectory have been transferred.

It is apparent that the alignment method and apparatus described above allow the requirement of precision needed to be met. In particular, it is possible to obtain a high degree of precision due to the fact that the alignment procedure is carried out between the virtual image of the graphic pattern and the real image of the graphic pattern, with the flat element positioned on the support table, therefore in the situation of real deformation of the flat element.

Moreover, the alignment procedure is carried out just before the cutting operation, therefore without further elements able to alter the positioning of the flat element and therefore the ratio between the cutting trajectory and the graphic pattern.

Finally, it should be noted that, unlike other known alignment systems, which adapt the shape of the shapes to the deformation of the flat element, altering the coordinates of the cutting trajectory, in the proposed alignment method it is not necessary to perform such a deformation, but only a translation of the cutting trajectory.

A man skilled in the art may make several changes, adjustments, adaptations and replacements of elements with other functionally equivalent ones to the embodiments of the method and apparatus according to the invention in order to meet incidental needs, without departing from the scope of the following claims. Each of the features described as belonging to a possible embodiment can be obtained independently of the other embodiments described.

The invention claimed is:

1. A method for aligning a cutting trajectory of a flat element with respect to a selected graphic pattern present on said flat element, the method comprising:
    providing a working file storing initial spatial coordinates of a trajectory defining the cutting trajectory with respect to a reference system, and graphic pattern coordinates defining a position of said selected graphic pattern with respect to the cutting trajectory, wherein a virtual image of the cutting trajectory is obtained from the initial spatial coordinates of the cutting trajectory and a virtual image of the selected graphic pattern is obtained from the graphic pattern coordinates;
    positioning the flat element to be cut on a support table;
    projecting onto the flat element, by a projector device, an image of a reference figure including the virtual image of the cutting trajectory and the virtual image of the selected graphic pattern;
    framing, by a camera, at least one portion of the flat element including at least one part of the selected graphic pattern and at least one part of said image of the reference figure;
    displaying on a display device:
        the image framed by the camera including the at least one part of the selected graphic pattern and the at least one part of said image of the reference figure, and
        the virtual image of the selected graphic pattern;
    moving the image of the reference figure or the virtual image of the selected graphic pattern until, on the display device, a portion of the virtual image of the selected graphic pattern coincides with a corresponding real image of the selected graphic pattern taken by the camera wherein the movement of the image of the reference figure or of the virtual image of the selected graphic pattern causes an update of the spatial coordinates of the cutting trajectory.

2. The method of claim 1, further comprising:
    controlling motorized means of the projector device responsible for spatial positioning of the image of the reference figure on the flat element based on the updated spatial coordinates of the cutting trajectory.

3. The method of claim 1 wherein, when the virtual image of the selected graphic pattern is superimposed onto the image including the at least one part of the selected graphic pattern, final spatial coordinates of the cutting trajectory are saved in the working file.

\* \* \* \* \*